United States Patent
Paik et al.

(10) Patent No.: US 10,825,194 B2
(45) Date of Patent: Nov. 3, 2020

(54) APPARATUS AND METHOD FOR RE-IDENTIFYING OBJECT IN IMAGE PROCESSING

(71) Applicant: CHUNG ANG University Industry Academic Cooperation Foundation, Seoul (KR)

(72) Inventors: Joonki Paik, Seoul (KR); Miri Kim, Seoul (KR); Jinbeum Jang, Suwon-si (KR)

(73) Assignee: Chung Ang University Industry Academic Cooperation Foundation, Seoul (KR)

(*) Notice: Subject to any disclaimer, the term of this patent is extended or adjusted under 35 U.S.C. 154(b) by 203 days.

(21) Appl. No.: 16/039,452

(22) Filed: Jul. 19, 2018

(65) Prior Publication Data

US 2019/0206077 A1 Jul. 4, 2019

(30) Foreign Application Priority Data

Jan. 2, 2018 (KR) .................. 10-2018-0000382

(51) Int. Cl.
*G06K 9/00* (2006.01)
*G06T 7/73* (2017.01)
*G06T 7/41* (2017.01)
*G06K 9/46* (2006.01)

(52) U.S. Cl.
CPC ............ *G06T 7/73* (2017.01); *G06K 9/00771* (2013.01); *G06K 9/4676* (2013.01); *G06T 7/41* (2017.01)

(58) Field of Classification Search
None
See application file for complete search history.

(56) References Cited

U.S. PATENT DOCUMENTS

2015/0049910 A1* 2/2015 Ptucha ............... G06K 9/621
382/103

FOREIGN PATENT DOCUMENTS

KR 10-2013-0098771 A 9/2013
KR 10-1512048 B1 4/2015

OTHER PUBLICATIONS

Talib et al., "A weighted dominant color descriptor for content-based image retrieval" J. Vis. Commun. Image R. vol. 24, Issue 3, Apr. 2013, pp. 345-360. (Year: 2013).*
Ptucha et al. "Manifold Based Sparse Representation for Facial Understanding in Natural Images", Image and Visual Computing, vol. 31, 2013, pp. 365-378. (Year: 2013).*

* cited by examiner

*Primary Examiner* — Wei Wen Yang
(74) *Attorney, Agent, or Firm* — Rabin & Berdo, P.C.

(57) ABSTRACT

The apparatus includes: a weighted feature extractor configured to extract a weighted feature from an input image and generate a weighted descriptor to which a feature of a salient region is applied; a dictionary constructor configured to construct a dictionary composed of images with different characteristics of one object using the weighted descriptor to which the feature of the salient region is applied by the weighted feature extractor and store the dictionary in a database (DB); and a coefficient estimator and ID determiner configured to apply sparse representation for estimating a coefficient that allows an object to be reconstructed as much as possible with a few linear combinations of candidate objects of a target object constituting the dictionary, and perform identification using an error between a target and the reconstructed object.

14 Claims, 6 Drawing Sheets

$$CosSimilarity = \frac{\mathbf{d}_{ip} \cdot \mathbf{d}_{iq}}{\|\mathbf{d}_{ip}\| \|\mathbf{d}_{iq}\|}$$

APPARATUS AND METHOD FOR RE-IDENTIFYING OBJECT IN IMAGE PROCESSING

CROSS-REFERENCE TO RELATED APPLICATION

This application claims priority to and the benefit of Korean Patent Application No. 2018-0000382, filed on Jan. 2, 2018, the disclosure of which is incorporated herein by reference in its entirety.

BACKGROUND

1. Field of the Invention

The present invention relates to object recognition and image processing, and more specifically, to an apparatus and method for re-identifying an object in image processing, which use saliency-based learning and sparse representation to allow cameras having different characteristics for global monitoring to accurately identify one object.

2. Discussion of Related Art

Recently, with an increasing interest in utilization of intelligent video surveillance and human-object interaction, a human behavior recognition model, which automatically identifies human behavior in a video, has been attracting much attention and research in the field of video analysis.

As the conventional technology for recognizing human behavior, an approach of using a feature vector, which extracts a learning feature vector from a learning image, constructs a learning dictionary in advance, and extracts an input feature vector from an input image when the input image is received, is used.

Subsequently, a human behavior is recognized by matching the input feature vector and a learning feature vector.

As methods of describing a feature of an image, a global descriptor and a local descriptor are used, wherein the global descriptor is used to represent an overall feature of an image using one vector and the local descriptor is used to extract multiple regions having apparent characteristics as compared to other regions of an image and represent a feature of the image using a plurality of vectors for the respective regions.

The local descriptor is based on a local technique, thereby allowing the same description to be generated for the same regions regardless of geometrical changes of an image. Accordingly, when the local descriptor is used, an object in an image can be recognized and extracted without pre-processing, such as image segmentation, and particularly, even when a part of the image is occluded, the local descriptor may be relatively robust in representing a feature of the image.

Because of such advantages, the local descriptor is widely utilized in the fields of pattern recognition, computer vision, and computer graphics. Examples of such utilization include object recognition, image search, and panorama generation.

A process of computing a local descriptor is mainly divided into two steps. In the first step, points having discriminative features from those of other neighboring pixels are extracted as feature points, and in the second step, a descriptor is computed using the extracted feature points and the neighboring pixel values.

Meanwhile, a technology for generating a feature descriptor using local region information and matching a local feature descriptor of another image using the generated feature descriptor is applied to various computer vision fields, such as content-based image/video retrieval, object recognition, object tracking, augmented reality, and the like.

Scale-invariant feature transform (SIFT) and speeded-up robust features (SURF) are typical examples of a local feature-based image processing technology using feature points. Such techniques commonly extract a point, such as a corner of a scale-space, at which a variation of pixel statistical value is suitable as a feature point, and extract a feature descriptor using a relationship between the feature point and the neighboring regions.

However, since the size of the local feature descriptor is considerably large, in many cases the size of a descriptor of an entire image is frequently larger than a compressed size of the image. In this case, only a descriptor with a large capacity is extracted even when a simple feature descriptor is needed, and hence there is a problem in that a large capacity memory is consumed for storing the descriptor.

In addition, the conventional object recognition technology has a fundamental problem of low real-time properties and a problem of degradation of recognition performance.

FIGS. 1 and 2 are configuration diagrams illustrating an object recognition process in general image processing.

An object recognition technology in conventional image processing has limitations of single camera-based monitoring and camera network-based monitoring which rely on time and space due to the above-described problems.

There is a difficulty in re-identifying an object due to some challenges, such as illumination changes, a low resolution, pose changes, and occlusion, and there are inefficiency problems according to a method of constructing multi-images of each gallery in signal processing for re-identifying an object and a problem in that the number of combinations capable of representing a target is increased when there are many similar atoms.

Therefore, there is a need to develop a new technology that solves the aforementioned problems and allows cameras having different characteristics for global monitoring to accurately identify one object.

RELATED ART DOCUMENTS

Patent Documents

Korean Patent Registration No. 10-1512048
Korean Laid-Open Patent Publication No. 10-2013-0098771

SUMMARY OF THE INVENTION

In order to solve the problems of a conventional object recognition and image processing technology, an objective of the present invention is to provide an apparatus and method for re-identifying an object in image processing, which allow cameras having different characteristics for global monitoring to accurately identify one object.

One of objectives of the present invention is to provide an apparatus and method for re-identifying an object in image processing, which use saliency-based learning and sparse representation to enhance accuracy and robustness of object identification.

Another objective of the present invention is to provide an apparatus and method for re-identifying an object in image processing, which allows an observed signal to be constructed with a few linear combinations of atoms constituting a dictionary using sparse representation.

In addition, one of the objectives of the present invention is to provide an apparatus and method for re-identifying an object in image processing, which estimate a coefficient that allows an object to be reconstructed as much as possible with a few linear combinations of candidate objects of a target object constituting a dictionary and performs identification using an error between a target and the reconstructed object, thereby increasing accuracy.

Another objective of the present invention is to provide an apparatus and method for re-identifying an object in image processing, which use a weighted feature descriptor to resolve a feature extraction problem restricted by a small area of an object occupying an image.

One of the objectives of the present invention is to provide an apparatus and method for re-identifying an object in image processing, which generate a weighted descriptor to which a feature of a salient region is applied for re-identifying an object, thereby reducing a dictionary due to removal of redundant information and facilitating coefficient estimation.

The present invention is not limited hereto, and other objectives not described above will be more clearly understood from what has been set forth hereunder.

In one general aspect, there is provided an apparatus for re-identifying an object in image processing, the apparatus including: a weighted feature extractor configured to extract a weighted feature from an input image and generate a weighted descriptor to which a feature of a salient region is applied; a dictionary constructor configured to construct a dictionary composed of images with different characteristics of one object using the weighted descriptor to which the feature of the salient region is applied by the weighted feature extractor and store the dictionary in a database (DB); and a coefficient estimator and ID determiner configured to apply sparse representation for estimating a coefficient that allows an object to be reconstructed as much as possible with a few linear combinations of candidate objects of a target object constituting the dictionary, and perform identification using an error between a target and the reconstructed object.

In another general aspect, there is provided a method of re-identifying an object in image processing, the method including: a weighted feature extraction operation of extracting a weighted feature from an input image and generating a weighted descriptor to which a feature of a salient region is applied; a dictionary construction operation of constructing a dictionary composed of images with different characteristics of one object using the weighted descriptor to which the feature of the salient region is applied and storing the dictionary in a DB; and a coefficient estimation and ID decision operation of applying sparse representation for estimating a coefficient that allows an object to be reconstructed as much as possible with a few linear combinations of candidate objects of a target object constituting the dictionary, and performing identification using an error between a target and the reconstructed object.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of an apparatus and method for re-identifying an object in image processing according to the present invention will be described.

Advantages and features of the apparatus and method for re-identifying an object in image processing according to the present invention will become apparent with reference to the embodiments described in detail below with reference to the accompanying drawings.

Figure 1:
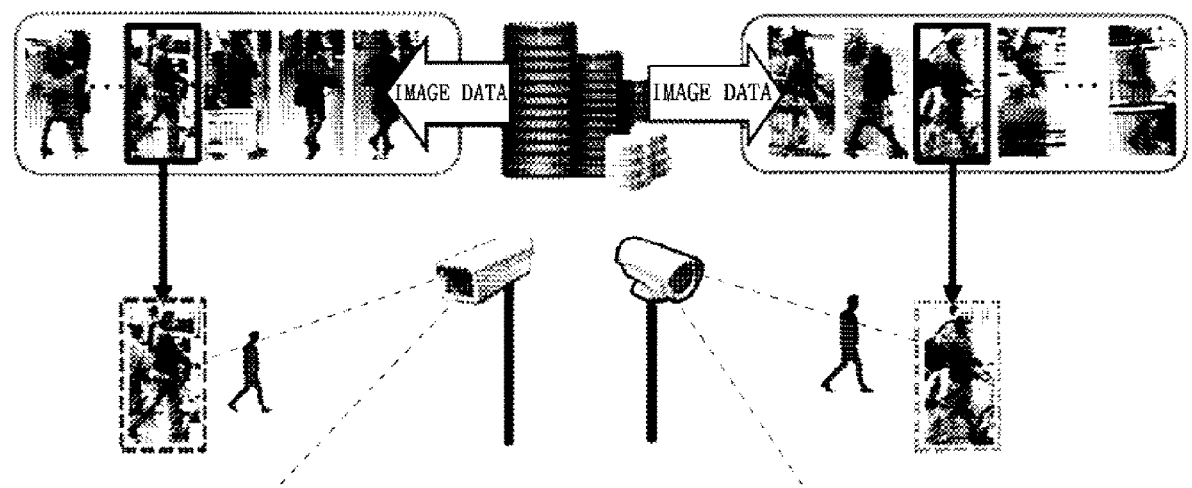
FIG. 1 is a configuration diagram illustrating a general surveillance camera and an image processing process.
Figure 2:
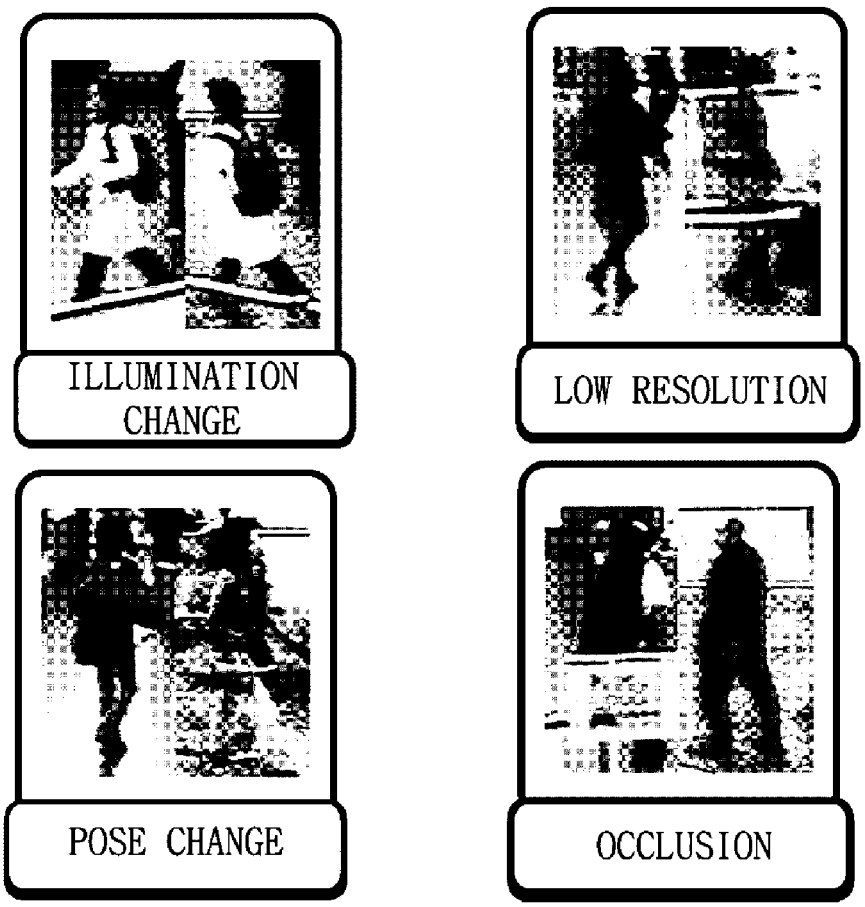
FIG. 2 is a configuration diagram illustrating problematic factors in an object re-identification process of a conventional technology.
Figure 3:
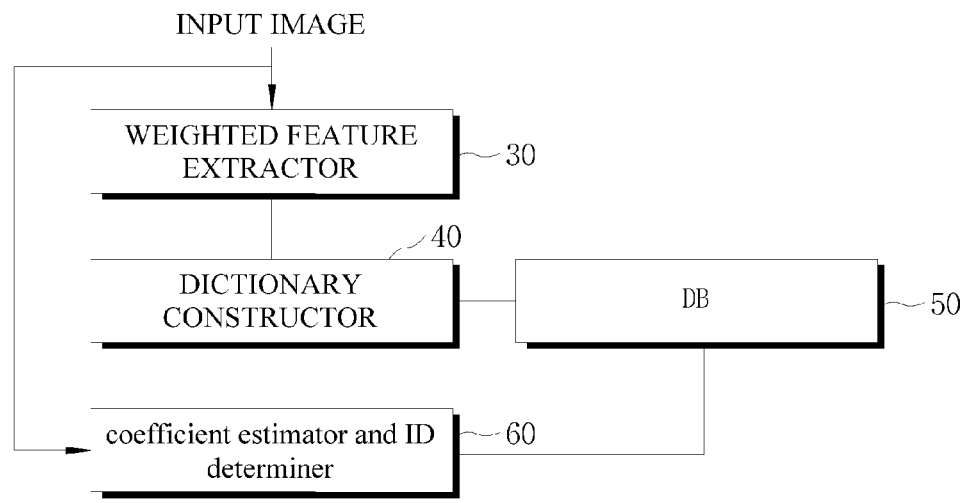
FIG. 3 is a configuration diagram illustrating an apparatus for re-identifying an object in image processing according to the present invention.
Figure 4:
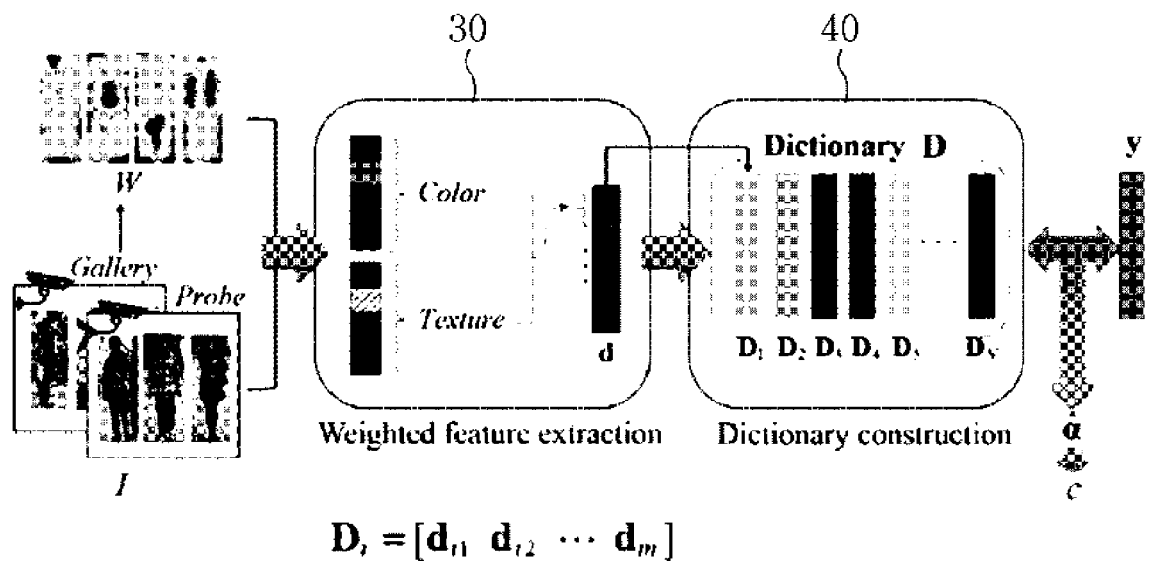
FIG. 4 is a detailed configuration diagram illustrating an apparatus for re-identifying an object in image processing according to the present invention.

FIG. 3 is a configuration diagram illustrating an apparatus for re-identifying an object in image processing according to the present invention, and FIG. 4 is a detailed configuration diagram illustrating an apparatus for re-identifying an object in image processing according to the present invention.

The apparatus and method for re-identifying an object in image processing according to the present invention are provided to allow cameras having different characteristics for global monitoring to accurately recognize one object.

To this end, the present invention includes a configuration using saliency-based learning and sparse representation in order to enhance accuracy and robustness of object identification and ensure the real-time object identification, where saliency indicates an apparent visual-perceptual characteristic of an object.

The present invention includes a configuration to reconstruct an observed signal with a few linear combinations of atoms constituting a dictionary using sparse representation.

The present invention includes a configuration to estimate a coefficient that allows an object to be reconstructed as much as possible with a few linear combinations of candidate objects of a target object constituting a dictionary and perform identification using an error between a target and a reconstructed object.

The present invention includes a configuration to generate a descriptor to which a feature of a salient region is applied, thereby reducing a dictionary due to removal of redundant information and facilitating coefficient estimation.

The configurations for re-identifying an object in image process according to the present invention, which will be described hereinafter, are construed to be applicable to any apparatus, such as a surveillance camera such as a closed-circuit television (CCTV) camera, an image tracking system, a personal digital assistant (PDA), a smart phone, a navigation terminal, a desktop computer, or a personal computer such as a notebook computer, which can recognize an object contained in an image and output information about the recognized object.

As shown in FIGS. 3 and 4, the apparatus for re-identifying an object in image processing according to the present invention includes a weighted feature extractor 30 configured to extract a weighted feature from an input image and generate a descriptor to which a feature of a salient region is applied, a dictionary constructor 40 configured to construct a dictionary composed of images with the most different characteristics of one object so as to reduce the dictionary and facilitate coefficient estimation using the descriptor to which the feature of the salient region is applied by the weighted feature extractor 30 and then store the dictionary in a database (DB) 50, and a coefficient estimator and ID determiner 60 configured to estimate a coefficient that allows an object to be reconstructed as much as possible with a few linear combinations of candidate objects of a target object and perform identification using an error between a target and the reconstructed object.

Sparsity of sparse representation used in the configuration for re-identifying an object in image processing according to the present invention indicates that a coefficient is zero or close to zero.

The present invention uses such sparse representation and uses a principle that reconstructs an observed signal with a few linear combinations of atoms constituting a dictionary.

This will be expressed below:

$$y = D\alpha \qquad \text{[Equation 1]}$$

In the equation representing the application of sparse representation of object re-identification, y denotes an object (target) to be re-identified and D denotes a set of candidate objects.

As such, a coefficient that allows an object to be reconstructed as much as possible with a few linear combinations of candidate objects of the target object constituting a dictionary is estimated and identification (matching) using an error between the target and the reconstructed object is performed.

In Equation 1, $\alpha$ represents a weight assigned as an N×1 column vector, D represents a pre-defined M×N dictionary with N samples that have M-dimensional features, and y is reconstructed signals having the same size as $\alpha$.

To satisfy the equation, atoms of $\alpha$ should have a non-zero value, and y is generated by combining only a few dictionary elements selected by non-zero atoms of $\alpha$.

When dictionary D is given, Equation 1 is modified to minimize the number of the non-zero atoms.

$$\hat{\alpha} = \operatorname*{argmin}_{\alpha} \|y - D\alpha\|_2^2 + \lambda \|\alpha\|_0, \qquad \text{[Equation 2]}$$

where $\hat{\alpha}$ represents a modified sparse vector, $\lambda$ represents a regularization factor, $\|\cdot\|_2^2$ represents the $l_2$-norm operator, and $\|\cdot\|_0$ to represents the $l_0$-norm operator.

$\hat{\alpha}$ is the first term which is optimally reconstructed due to an error between the input signal y and recovered version $D\alpha$ and satisfies a sparsity condition.

Figure 5:
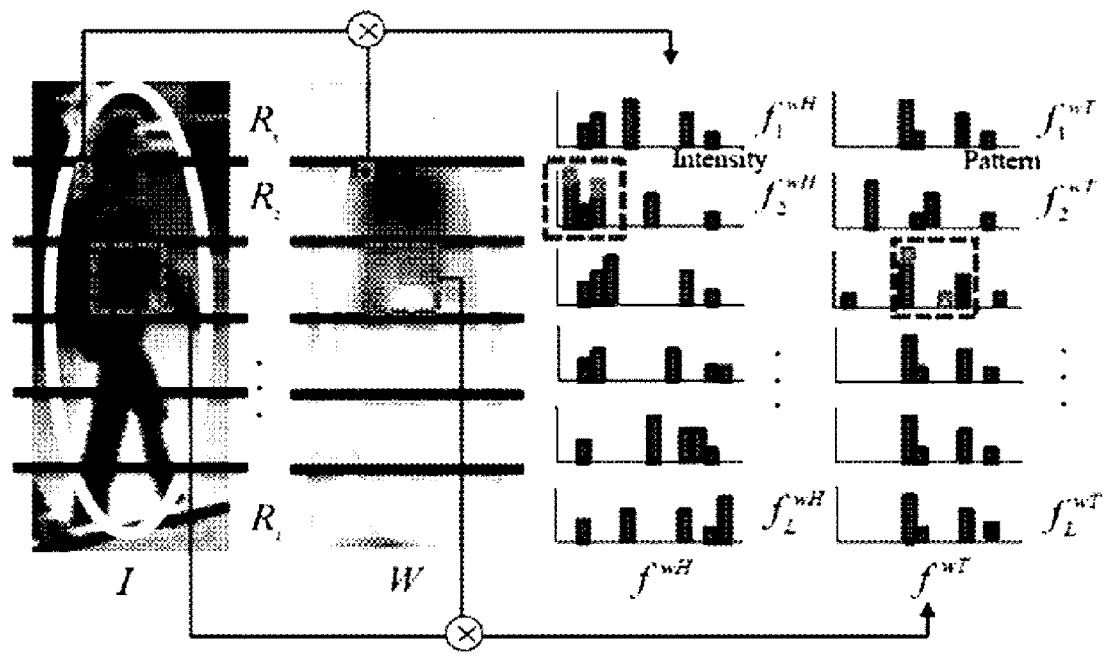
FIG. 5 is a detailed configuration diagram illustrating a weighted feature extractor.

FIG. 5 is a detailed configuration diagram illustrating a weighted feature extractor.

The weighted feature extractor may solve a feature extraction problem restricted by a small area of an object occupying an image.

A weighted feature descriptor may be defined below.

Equations 3 and 4 define a weighted hue saturation value histogram.

$$W_s^C(b) = \begin{cases} W_s^C(b) + W(u,v), & \text{if } I_s^H(u,v) \in b \\ W_s^C(b), & \text{otherwise,} \end{cases} \qquad \text{[Equation 3]}$$

where $I_s^H$ represents a hue channel of the $s^{th}$ stripe, $W_s^C$ represents a weighted vector, b is a bin of the histogram, and (u, v) are coordinates of each stripe.

Each histogram bin is modified by multiplying it by a corresponding weight as shown in Equation 4.

$$f_s^{wC}(b) = W_s^C(b) f_s^C(b) f_s^C(b), \qquad \text{[Equation 4]}$$

where $f_s^{wC}$ represents a color histogram of the $s^{th}$ stripe satisfying $f_s^{wC} \in \mathbb{R}^{1 \times M_C}$ with $M_C$ histogram bins.

Equations 5 and 6 define a weighted local binary pattern (LBP).

$$f_s^{wT}(I_s^T(u,v)) = W_s^T(I_s^T(u,v)) f_s^T(I_s^T(u,v)), \qquad \text{[Equation 5]}$$

wherein $f_s^{wT}$ denotes a weighted texture descriptor of the $s^{th}$ stripe satisfying $f_s^{wT} \in \mathbb{R}^{1 \times M_T}$ with $M_T$ bins, $I_s^T$ is a texture pattern computed by LBP at (u, v), $f_s^T$ denotes an LBP histogram from each stripe region, and $W_s^T$ denotes a weight vector at the same size as $f_s^T$.

A total descriptor $d \in \mathbb{R}^M$ of an object is defined by arranging all stripe regions as shown in Equation 6.

$$d = [f_1^{wC} f_1^{wT} f_2^{wC} f_2^{wT} \ldots f_L^{wC} f_L^{wT}]_T \qquad \text{[Equation 6]}$$

Figure 6:
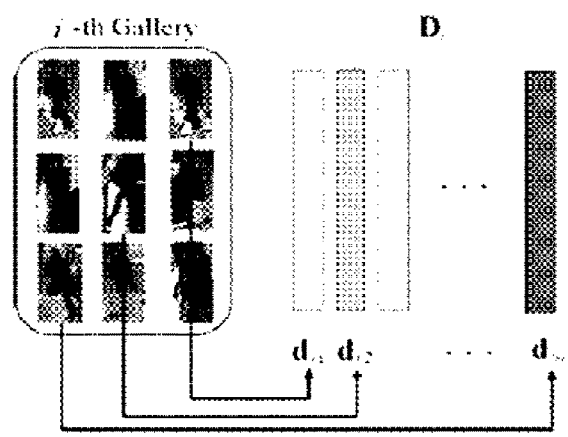
FIG. 6 is a configuration diagram illustrating a dictionary constructor.

FIG. 6 is a configuration diagram illustrating a dictionary constructor.

In the present invention, a dictionary is constructed to solve an inefficiency problem according to a method of constructing multiple images of each gallery and a problem in that the number of combinations that can represent a target increases when there are many similar atoms.

In the present invention, a dictionary is constructed with images with the most different characteristics of one object, thereby reducing the dictionary and facilitating coefficient estimation due to removal of redundant information.

Figure 7:
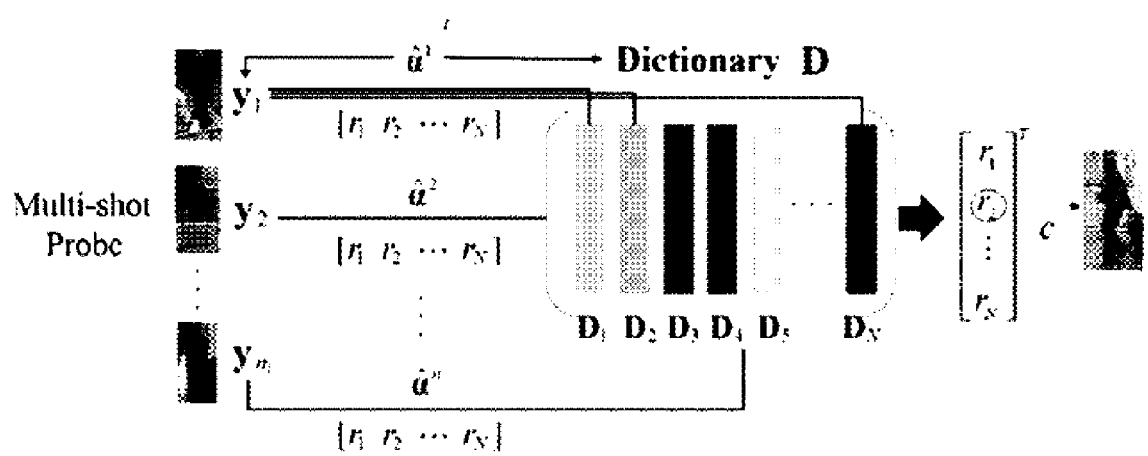
FIG. 7 is a configuration diagram of a coefficient estimator and ID determiner.

FIG. 7 is a configuration diagram of a coefficient estimator and ID determiner.

In the present invention, a sparse coefficient is estimated using a least absolute shrinkage and selection operator (LASSO) as shown in Equation 2.

A method in which a reconstruction error of galleries is measured by computing a difference between the galleries and a reconstructed probe and an optimal gallery is searched using a reconstructed probe from an estimated coefficient and D from N gallery images is used.

Equations 7 and 8 represent decision of a minimum error and an ID using multi-shot probes.

$$r_i = \min_k \|y_k - D_i \hat{\alpha}_i^k\|, \qquad \text{[Equation 7]}$$

where $r_i$ represents a minimum reconstruction error of the $i^{th}$ gallery for a probe, and $y_k$ represents a feature descriptor of the $k^{th}$ image in a probe.

An index of the gallery corresponding to the probe is defined as Equation 8 below.

$$c = \operatorname*{argmin}_{i} \{r_i\}, \, i = 1, 2, \ldots, N, \qquad \text{[Equation 8]}$$

Where c represents a selected identity of the probe to re-identify.

Figure 8:
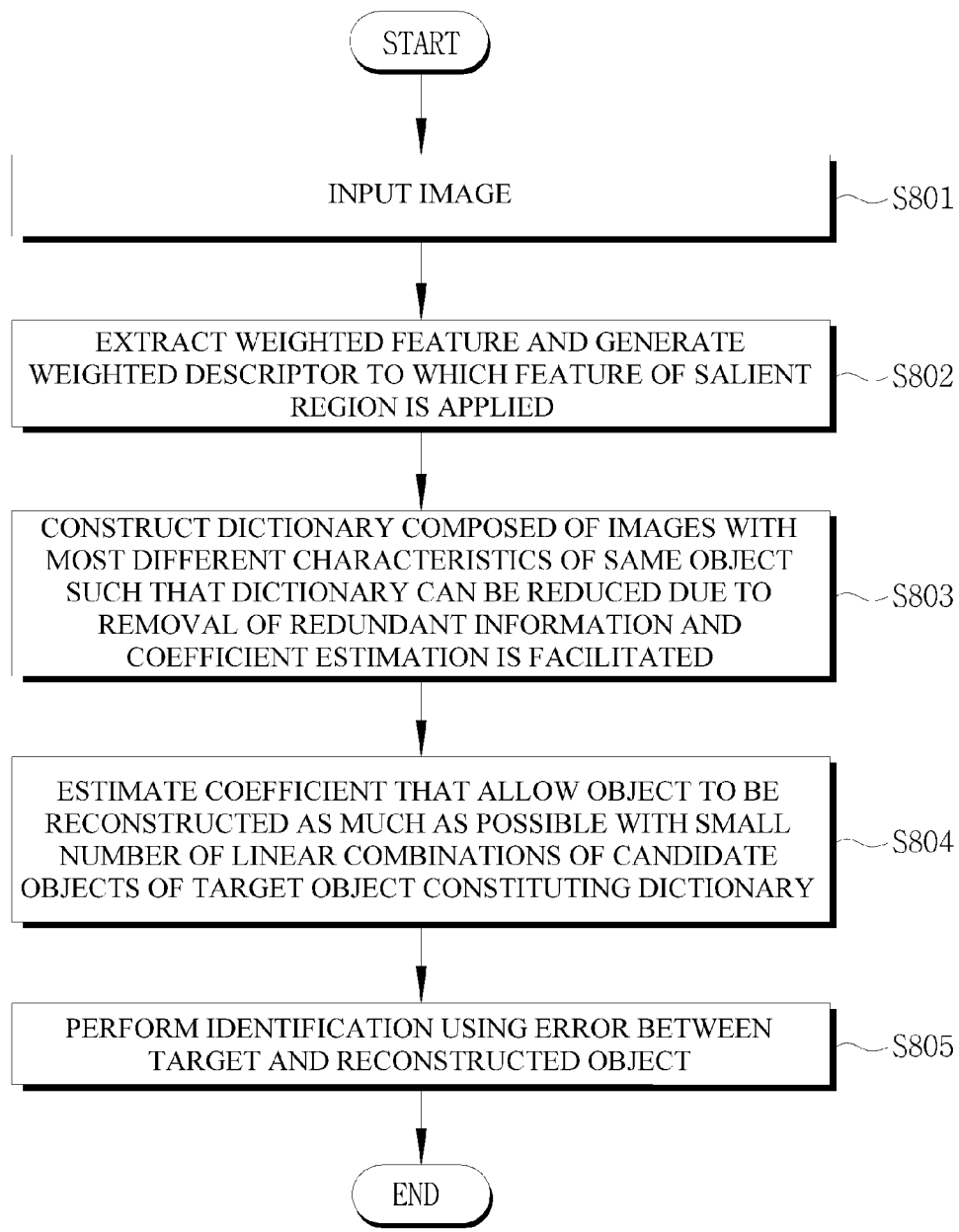
FIG. 8 is a flowchart illustrating a method of re-identifying an object in image processing according to the present invention.

FIG. 8 is a flowchart illustrating a method of re-identifying an object in image processing according to the present invention.

Initially, when an image is input (S801), a weighted feature is extracted and a descriptor to which a feature of a salient region is applied is generated (S802).

Subsequently, a dictionary is constructed with images with the most different characteristics of one object such that the dictionary is reduced due to removal of redundant information and coefficient estimation is facilitated (S803).

Subsequently, a coefficient that allows an object to be reconstructed as much as possible with a few linear combinations of candidate objects of a target object constituting the dictionary is estimated (S804).

An identification process using an error between a target and the reconstructed object is performed (S805).

The above-described apparatus and method for re-identifying an object in image processing according to the present invention allow cameras having different characteristics for global monitoring to accurately identify one object. Results obtained using continuous images captured by two non-overlapping cameras in a crowded airport with challenges, such as background clutter, occlusion, and viewpoint and illumination changes.

Table 1 shows results of saliency-based weighted feature extraction.

TABLE 1

| Rank | Dataset ILIDS-VID | | | |
|---|---|---|---|---|
| | 1 | 5 | 10 | 20 |
| HSV | 10% | 24.6% | 31.3% | 41.3% |
| LBP | 5.3% | 17.3% | 26% | 38.6% |
| HSV + LBP | 16.6% | 34.6% | 43.3% | 50% |
| Weighted HSV | 14% | 28.6% | 37.3% | 48.6% |
| Weighted LBP | 8.3% | 21.3% | 28.6% | 40.6% |
| Proposed weighted descriptor | 28.6% | 47.3% | 58.6% | 66.6% |

It can be seen that the performance is improved by the robust atom configuration of the weighted feature descriptor by applying the apparatus and method for re-identifying an object in image processing according to the present invention.

Table 2 shows a result of dictionary construction to which the apparatus and method for re-identifying an object in image processing according to the present invention are applied.

TABLE 2

| Rank | Dataset ILIDS-VID | | | |
|---|---|---|---|---|
| | 1 | 5 | 10 | 20 |
| Sequential images | 14.6% | 34% | 43.3% | 60% |
| Stride selection | 20% | 42.6% | 53.3% | 65.3% |
| Proposed dictionary construction | 28.6% | 47.3% | 58.6% | 66.6% |

It can be seen that a coefficient estimation problem caused by similar atoms can be solved.

Table 3 shows a result of object re-identification to which the apparatus and method for re-identifying an object in image processing according to the present invention are applied.

TABLE 3

| Rank | Dataset ILIDS-VID | | | |
|---|---|---|---|---|
| | 1 | 5 | 10 | 20 |
| ISR | 10% | 24.6% | 31.3% | 41.3% |
| eSDC | 5.3% | 17.3% | 26% | 38.6% |
| LC-KSVD | 24.3% | 38.5% | 42.3% | 47.3% |
| DVR | 23.3% | 42.4% | 55.3% | 68.4% |
| SRID | 24.9% | 44.5% | 54.1% | 68.8% |
| Proposed method | 28.6% | 47.3% | 58.6% | 66.6% |

The above-described apparatus and method for re-identifying an object in image processing according to the present invention resolves a feature extraction problem restricted by a small area of an object occupying an image by using a weighted feature descriptor to which a feature of a salient region is applied, thereby allowing cameras having different characteristics for global monitoring to accurately identify one object.

The apparatus and method for re-identifying an object in image processing according to the present invention achieve the following effects.

First, by using saliency-based learning and sparse representation, it is possible to allow cameras having different characteristics for global monitoring to accurately identify one object.

Second, by using saliency-based learning and sparse representation, it is possible to enhance the accuracy and robustness of object identification.

Third, by using sparse representation, it is possible to reconstruct an observed signal with a few linear combinations of atoms constituting a dictionary.

Fourth, it is possible to estimate a coefficient that allows an object to be reconstructed as much as possible with a few linear combinations of candidate objects constituting a dictionary and perform identification using an error between a target and the reconstructed object, thereby increasing accuracy.

Fifth, it is possible to resolve a feature extraction problem restricted by a small area of an object occupying an image by using a weighted feature descriptor.

Sixth, a weighted description to which a feature of a salient region is applied is generated for re-identification of an object, thereby reducing a dictionary due to removal of redundant information and facilitating coefficient estimation.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

REFERENCE NUMERALS

30: WEIGHTED FEATURE EXTRACTOR
40: DICTIONARY CONSTRUCTOR
50: DB
60: COEFFICIENT ESTIMATOR AND ID DETERMINER

What is claimed is:
1. An apparatus for re-identifying an object in image processing, the apparatus comprising:

a weighted feature extractor configured to extract a weighted feature from an input image and generate a weighted descriptor to which a feature of a salient region is applied;

a dictionary constructor configured to construct a dictionary composed of images with the most different characteristics of one object using the weighted descriptor to which the feature of the salient region is applied by the weighted feature extractor and store the dictionary in a database (DB) such that redundant information is not included in the dictionary; and a coefficient estimator and ID determiner configured to apply sparse representation for estimating a coefficient that allows an object to be reconstructed as much as possible with a few linear combinations of candidate objects of a target object constituting the dictionary, and perform identification using an error between a target and the reconstructed object;

wherein an application of the sparse representation is defined as an equation of y=Dα, where y denotes an object (target) to be re-identified, D denotes a set of candidate objects, α represents a weight assigned as an N×1 column vector, D represents a pre-defined M×N dictionary with N samples that have M-dimensional features, and y is reconstructed signals having a same size as α;

wherein atoms of α must have a non-zero value, y is generated by combining only a few dictionary elements selected by non-zero atoms of α, and when dictionary D is given, the equation is modified as $$\hat{\alpha} = \underset{\alpha}{\operatorname{argmin}}(\|y - D\alpha\|_2^2 + \lambda\|\alpha\|_l)$$

to minimize a number of the non-zero atoms, where $\hat{\alpha}$ represents a modified sparse vector, λ represents a regularization factor, $\|\bullet\|_2^2$ represents the $l_2$-norm operator, $\|\bullet\|_0$ represents the $l_0$-norm operator, and $\hat{\alpha}$ is a first term which is optimally reconstructed due to an error between input signal y and recovered version Dα and satisfies a sparsity condition.

2. The apparatus of claim 1, wherein the weighted feature descriptor of the weighted feature extractor is defined by a weighted hue saturation value (HSV) histogram as $$W_s^C(b) = \begin{cases} W_s^C(b) + W(u, v), & \text{if } I_s^H(u, v) \in b \\ W_s^C(b), & \text{otherwise,} \end{cases}$$

where $I_s^H$ represents a hue channel of an $s^{th}$ stripe, $W_s^C$ represents a weighted vector, b is a bin of the histogram, and (u, v) are coordinates of each stripe.

3. The apparatus of claim 2, wherein each histogram bin is modified by multiplying the histogram bin by a corresponding weight as shown in $f_s^{wC}(b)=W_s^C(b)f_s^C(b)$, wherein $f_s^{wC}$ represents a color histogram of the $s^{th}$ stripe satisfying $f_s^{wC} \in \mathbb{R}^{1 \times M_C}$ with $M_C$ histogram bins.

4. The apparatus of claim 1, wherein the weighted feature descriptor of the weighted feature extractor is defined by a weighted local binary pattern as $f_s^{wT}(I_s^T(u,v))=W_s^T(I_s^T(u,v))f_s^T(I_s^T(u,v))$, where $f_s^{wT}$ denotes a weighted texture descriptor of the $s^{th}$ stripe satisfying $f_s^{wT} \in \mathbb{R}^{1 \times M_T}$ with $M_T$ bins, $I_s^T$ is a texture pattern computed by LBP at (u, v), $f_s^T$ denotes an LBP histogram from each stripe region, and $W_s^T$ denotes a weight vector at a same size as $f_s^T$.

5. The apparatus of claim 4, wherein a total descriptor d∈ $\mathbb{R}^M$ of an object is defined by arranging all stripe regions as d=[$f_1^{wC} \, f_1^{wT} \, f_2^{wC} \, f_2^{wT} \ldots f_L^{wC} \, f_L^{wT}$].

6. The apparatus of claim 1, wherein the coefficient estimator and ID determiner estimates a sparse coefficient using a least absolute shrinkage and selection operator (LASSO), obtains a reconstruction error of galleries by computing a difference between the galleries and a reconstructed probe, and searches an optimal gallery using a reconstructed probe from an estimated coefficient and D from N gallery images, and a decision of a minimum error and an ID is defined as $$r_i = \min_k \|y_k - D_i \hat{\alpha}_i^k\|,$$

where $r_i$ represents a minimum reconstruction error of an $i^{th}$ gallery for a probe, and $y_k$ represents a feature descriptor of a $k^{th}$ image in a probe.

7. The apparatus of claim 6, wherein an index of a gallery corresponding to a probe is $$c = \underset{i}{\operatorname{argmin}}\{r_i\}, i = 1, 2, \ldots, N,$$

where c represents a selected identity of a probe to re-identify.

8. A method of re-identifying an object in image processing, the method comprising:

a weighted feature extraction operation of extracting a weighted feature from an input image and generating a weighted descriptor to which a feature of a salient region is applied;

a dictionary construction operation of constructing a dictionary composed of images with the most different characteristics of one object using the weighted descriptor to which the feature of the salient region is applied and storing the dictionary in a database (DB) such that redundant information is not included in the dictionary; and a coefficient estimation and ID decision operation of applying sparse representation for estimating a coefficient that allows an object to be reconstructed as much as possible with a few linear combinations of candidate objects of a target object constituting the dictionary, and performing identification using an error between a target and the reconstructed object;

wherein an application of the sparse representation is defined as an equation of y=Dα, where y denotes an object (target) to be re-identified, D denotes a set of candidate objects, α represents a weight assigned as an N×1 column vector, D represents a pre-defined M×N dictionary with N samples that have M-dimensional features, and y is reconstructed signals having a same size as α; and wherein atoms of α must have a non-zero value, y is generated by combining only a few dictionary elements selected by non-zero atoms of α, and when dictionary D is given, the equation is modified as $$\hat{\alpha} = \underset{\alpha}{\operatorname{argmin}}(\|y - D\alpha\|_2^2 + \lambda\|\alpha\|_1)$$

to minimize a number of the non-zero atoms, where $\hat{\alpha}$ represents a modified sparse vector, $\lambda$ represents a regularization factor, $\|\cdot\|_2^2$ represents the $l_2$-norm operator, $\|\cdot\|_0$ represents the $l_0$-norm operator, and $\hat{\alpha}$ is the first term which is optimally reconstructed due to an error between input signal y and recovered version $D\alpha$ and satisfies a sparsity condition.

9. The method of claim 8, wherein the weighted feature descriptor in the weighted feature extraction operation is defined by a weighted hue saturation value (HSV) histogram as $$W_s^C(b) = \begin{cases} W_s^C(b) + W(u, v), & \text{if } I_s^H(u, v) \in b \\ W_s^C(b), & \text{otherwise,} \end{cases}$$

where $I_s^H$ represents a hue channel of an $s^{th}$ stripe, $W_s^C$ represents a weighted vector, b is a bin of the histogram, and (u, v) are coordinates of each stripe.

10. The method of claim 9, wherein each histogram bin is modified by multiplying the histogram bin by a corresponding weight as shown in $f_s^{wC}(b) = W_s^C(b) f_s^C(b)$, wherein $f_s^{wC}$ represents a color histogram of the $s^{th}$ stripe satisfying $f_s^{wC} \in \mathbb{R}^{1 \times M_C}$ with $M_C$ histogram bins.

11. The method of claim 8, wherein the weighted feature descriptor in the weighted feature extraction operation is defined by a weighted local binary pattern as $f_s^{wT}(I_s^T(u,v)) = W_s^T(I_s^T(u,v)) f_s^T(I_s^T(u,v))$, where $f_s^{wT}$ denotes a weighted texture descriptor of the $s^{th}$ stripe satisfying $f_s^{wT} \in \mathbb{R}^{1 \times M_T}$ with $M_T$ bins, $I_s^T$ is a texture pattern computed by LBP at (u, v), $f_s^T$ denotes an LBP histogram from each stripe region, and $W_s^T$ denotes a weight vector at a same size as $f_s^T$.

12. The method of claim 11, wherein a total descriptor $d \in \mathbb{R}^M$ of an object is defined by arranging all stripe regions as $d = [f_1^{wC} \; f_1^{wT} \; f_2^{wC} \; f_2^{wT} \; \ldots \; f_L^{wC} \; f_L^{wT}]$.

13. The method of claim 8, wherein the coefficient estimation and ID decision operation comprises estimating a sparse coefficient using a least absolute shrinkage and selection operator (LASSO), obtaining a reconstruction error of galleries by computing a difference between the galleries and a reconstructed probe, searching an optimal gallery using a reconstructed probe from an estimated coefficient and D from N gallery images, and a decision of a minimum error and an ID is defined as $$r_i = \min_k \|y_k - D_i \hat{\alpha}_i^k\|,$$

where $r_i$ represents a minimum reconstruction error of an $i^{th}$ gallery for a probe, and $y_k$ represents a feature descriptor of a $k^{th}$ image in a probe.

14. The method of claim 13, wherein an index of a gallery corresponding to a probe is $$c = \underset{i}{\operatorname{argmin}}\{r_i\}, \; i = 1, 2, \ldots, N,$$

where c represents a selected identity of a probe to re-identify.

* * * * *